United States Patent [19]
Ohkawa

[11] 3,801,438
[45] Apr. 2, 1974

[54] TOROIDAL APPARATUS FOR CONFINING PLASMA

[75] Inventor: Tihiro Ohkawa, La Jolla, Calif.

[73] Assignee: The United States of America as represented by the United States Atomic Energy Commission, Washington, D.C.

[22] Filed: Apr. 3, 1970

[21] Appl. No.: 25,308

[52] U.S. Cl. .................................. 176/3, 315/111
[51] Int. Cl. ............................................. G21b 1/00
[58] Field of Search .................................... 176/1, 3

[56] References Cited
UNITED STATES PATENTS

| | | | |
|---|---|---|---|
| 2,993,851 | 7/1961 | Thomson et al. | 176/3 |
| 3,037,921 | 6/1962 | Tuck | 176/3 |
| 3,113,088 | 12/1963 | Josephson | 176/3 |
| 3,508,104 | 4/1970 | Braams | 176/3 |

FOREIGN PATENTS OR APPLICATIONS

| | | | |
|---|---|---|---|
| 955,268 | 4/1964 | Great Britain | 176/3 |
| 1,082,352 | 5/1960 | Germany | 176/3 |

Primary Examiner—Reuben Epstein
Attorney, Agent, or Firm—John A. Horan

[57] ABSTRACT

Toroidal apparatus for confining plasma in which at least three magnetic field producers are provided. One field producer provides a toroidal magnetic field. Another field producer provides a multipolar configuration for the toroidal field. A third field provides rotational transform for the multipolar magnetic field. All of the field producing means are outside of the toroidal confinement region.

12 Claims, 5 Drawing Figures

3,801,438
SHEET 1 OF 2
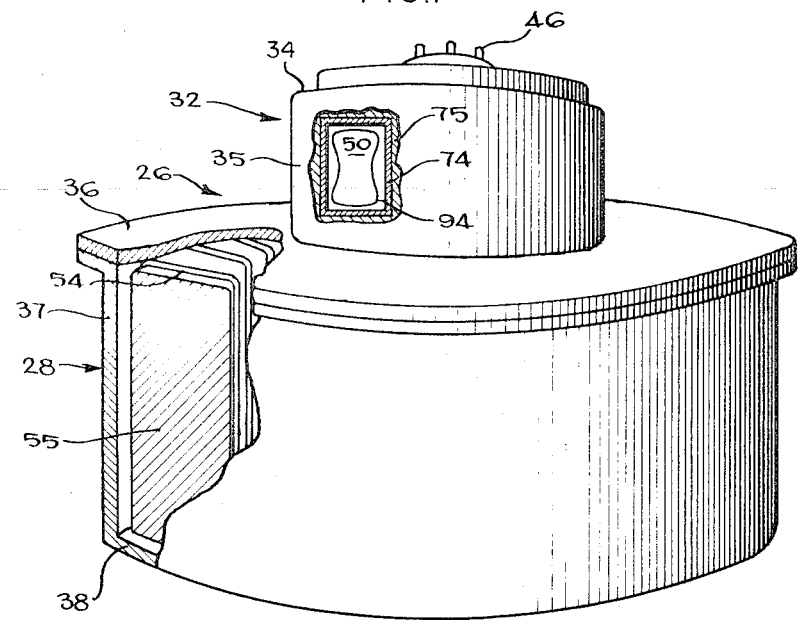
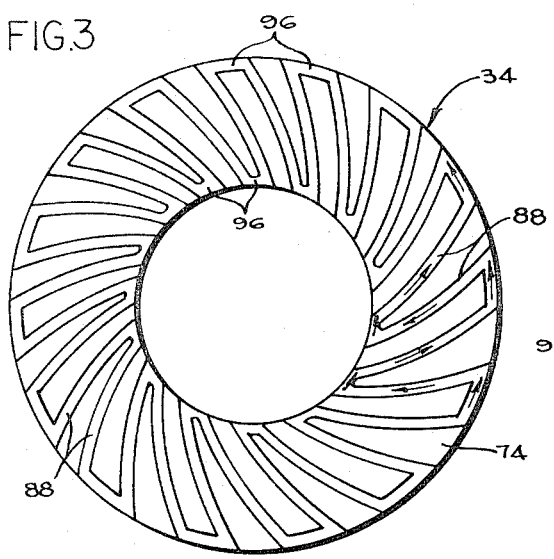
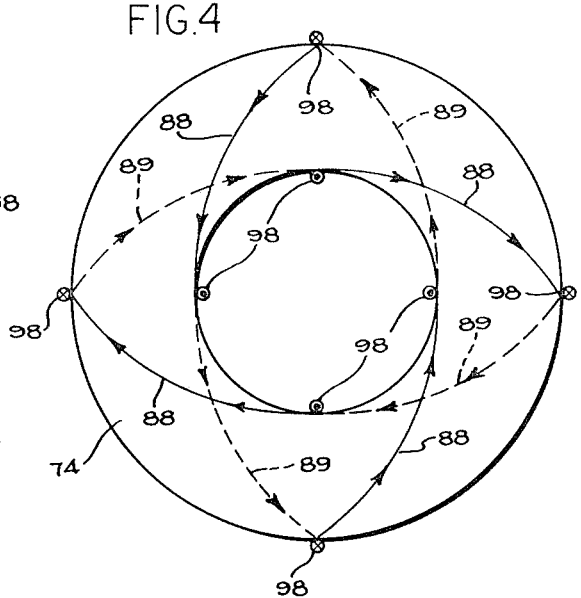
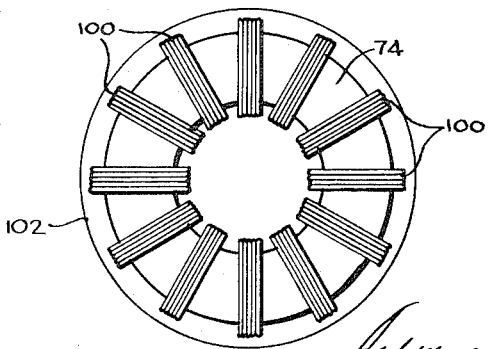
INVENTOR
TIHIRO OHKAWA
Anderson, Luedeka, Fitch, Even, & Tabin
ATTYS.

TOROIDAL APPARATUS FOR CONFINING PLASMA

This invention relates generally to apparatus for confining plasma and, more particularly, to an improved apparatus with which plasma may be confined with stability in a well defined region free of solid equipment components.

In recent years various devices have been developed for confining plasmas - ionized gases comprising approximately equal numbers of positively charged ions and free electrons at high temperatures. If a plasma is formed from a suitable gas or mixture of gases, such as deuterium or tritium, fusion reactions may occur within the plasma. Such fusion reactions may produce hightly energized protons, neutrons or other particles. If the proper conditions are realized the energy obtained from the fusion reactions may exceed the input energy and provide useful power.

In order to achieve such results it is necessary to confine the plasma in a given region at extremely high temperatures for an appreciable period of time. Solid walled containers of materials resistant to even the highest temperatures and having the greatest thermally insulative qualities are inadequate for this purpose since contact of the plasma ions with such containers inevitably cools the plasma, thus preventing the necessary conditions for fusion from occurring. Consequently a large number of magnetic and electrical field configurations and apparatus for producing them have been proposed as solutions to the problem of confining plasma.

One general type of geometrical configuration for plasma confinement which is receiving increasing attention is an endless tube such as a toroid with an externally imposed toroidal magnetic field, i.e., a field in which the magnetic lines of induction extend around the toroid generally parallel to its minor axis. Such a magnetic field in general may be produced by electrical currents in one or more conductive coils encircling the minor axis of the toroid.

This approach has been used in the United States built devices known as "Stellarators" and in the Russian "Tokamak" devices. Problems of plasma stability still exist in all of the devices, however.

Toroidal configurations have also been used with "multipolar" plasma apparatus in which a plurality of conductors are positioned within and extend around a toroidal plasma confinement region. The conductors are surrounded by a plurality of nests of toroidal closed flux surfaces, i.e., imaginary toroidal surfaces at all points of which the magnetic flux is the same, hence the configuration is termed multipolar. One such apparatus is disclosed in Kerst and Ohkawa U.S. Pat. No. 3,194,739 in which six circular conductors produce a twelve pole field. However, in later apparatus as few as two conductors have been utilized to form a quadrupole apparatus.

A significant problem with such apparatus has been the presence of the internal rods or conductors and the structures that support them within the plasma confinement region. The plasma can come in contact with these structures and thereby become cooled. One approach to this problem is set forth in my co-pending application Ser. No. 809,280. That application discloses the superpositioning of a toroidal magnetic field and a multipolar magnetic field. However, to eliminate the internal conductors electrical currents in the plasma are produced by inducing a toroidal electrical field in the plasma region.

Another approach has been the use of conductors wound helically around the toroidal confinement space so as to provide high magnetic shear as well as rotational transform, and thus to help stabilize the plasma. The use of helical windings, however, presents a number of problems. For example, accurate fabrication of a helically wound toroid is extremely difficult since three dimensions are involved. Access to the confinement space is difficult due to the helical winding completely surrounding the toroid. Moreover, the fields produced are not symmetrical with respect to the major axis of the toroid.

Accordingly a need exists for improved plasma confinement apparatus which does not utilize internal conductors.

The present invention solves many of these prior problems by utilizing conductive windings positioned outside of a toroidal confinement region which provide rotational transform. These coils are utilized in conjunction with a coil or coils which produce a toroidal magnetic field and coils which provide a multipolar toroidal configuration for the magnetic field. However, the added coils cause the plurality of nests of closed flux surfaces to be within the confinement region and the resultant field has substantially axial symmetry. In contrast with other apparatus no electrical fields are produced in the plasma so that steady state, rather than pulsed operation is feasible and construction of the apparatus and access to the confinement region is made easier by elimination of helical coils.

It is, therefore, an important object of this invention to provide an improved apparatus for stable confinement of plasma in steady state operation.

A further object of this invention is to provide a plasma apparatus in which the various physical components providing the confining fields are located outside of the confinement region.

Another object of this invention is to provide an apparatus for confining plasma which will minimize plasma losses.

Still another object of this invention is to provide an apparatus for confining plasma which produces a predetermined magnetic field directly dependent only upon accurate assembly of a simple configuration of conductors.

Yet another object of this invention is to provide a plasma apparatus which produces closed average magnetic flux surfaces which do not surround any coils.

Further objects of this invention are to provide plasma apparatus which produces toroidal multipolar magnetic fields in which the area of the magnetic flux surfaces decreases toward the wall of the apparatus, which have large magnetic shear and which are approximately axially symmetric.

Other objects and advantages of this invention will become apparent from the following description, considered in conjunction with the accompanying drawings, in which:

FIG. 1 is a perspective view of a plasma apparatus utilizing the present invention, with portions being broken away to show certain features;

FIG. 3 is a top view of the top planar coil shown in FIG. 2, or alternatively may be considered a bottom view of the bottom planar coil shown in FIG. 2;

FIG. 4 is a schematic diagram of alternate means of connecting the segments of the planar coils; and FIG. 5 is a diagrammatic view of an alternative means for producing a toroidal magnetic field.

Figure 2:
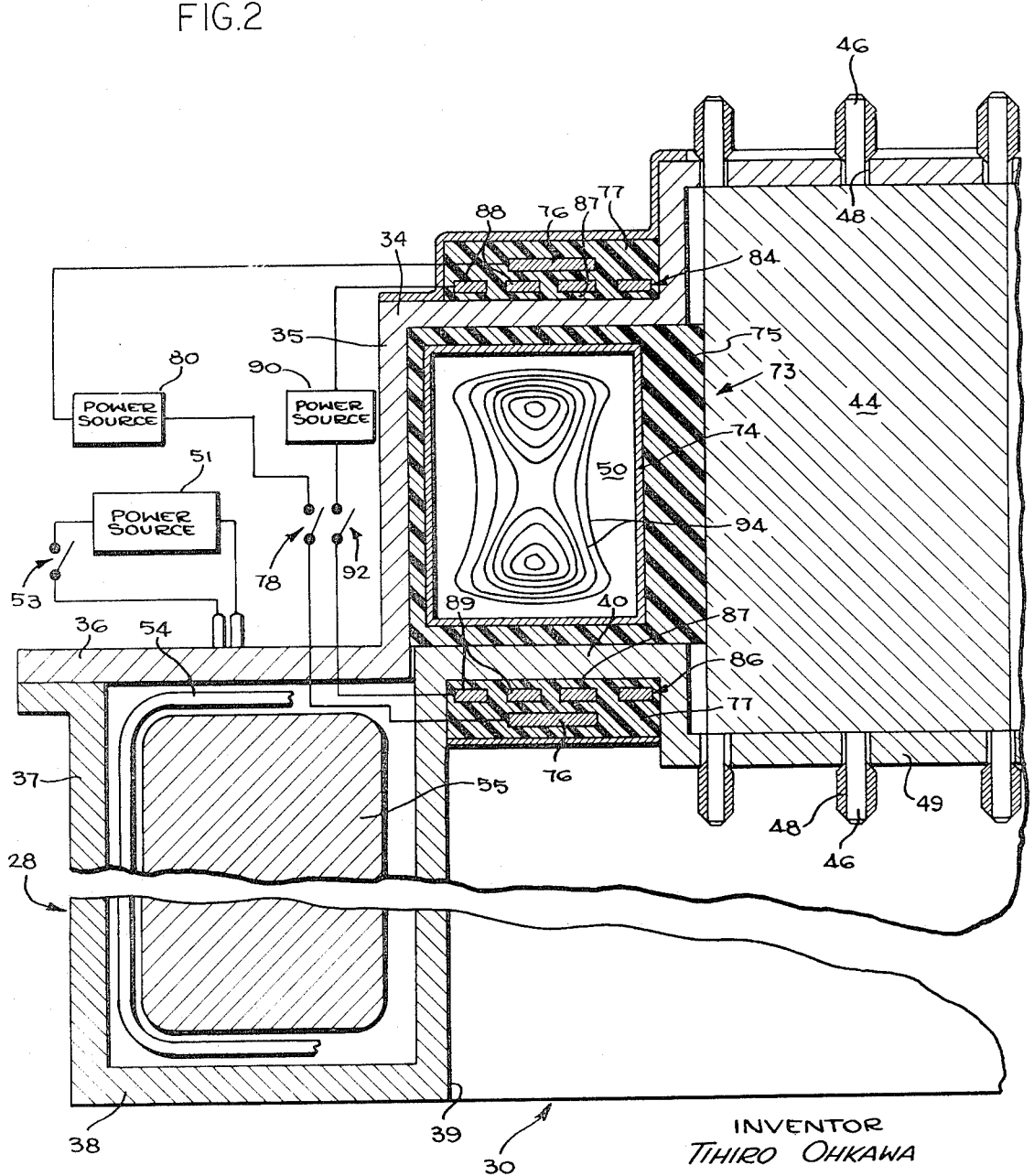
FIG. 2 is a partially diagrammatic vertical cross sectional view of a portion of the apparatus shown in FIG. 1.

Generally, the structure illustrated in FIGS. 1, 2 and 3 includes a housing 26, formed of conductive materials and electrically insulated from its environment, which functions as part of a first magnetic field producing means for producing a toroidal magnetic field as will shortly become apparent. The housing includes a toroidal lower portion 28 with a large central opening 30 and an upper portion in the form of a cylinder 32 which is positioned in large part over the central opening 30 for ease of access thereto through the opening. In order to provide a continuous current path along the surfaces of the housing 26, the top wall 34 and outside wall 35 of the cylinder 32 are integral with the upper wall 36 of the toroid 28 and the outer wall 37, bottom wall 38 and inner wall 39 of the toroid are integral with the bottom wall 40 of the cylinder 32.

A radially symmetrical current path is provided by electrically interconnecting the top and bottom walls of the cylinder 32 through a conducting rod 44 centrally positioned in the cylinder by a purality of connecting prongs 46 inserted in mating apertures 48 of the respective surfaces of the cylinder. As illustrated, the portion 49 of the lower surface 40 of the cylinder 32 which is engaged by the rod 44 is removable for access to the inside of the cylinder 32. It may be seen that the bottom wall 40 of the cylinder 32 and the outer wall 35 thereof almost touch one another but are insulated from one another so that the cylinder includes a region almost completely surrounded by conductive walls which form part of a conductive path also surrounding the toroidal lower portion 28 of the housing.

Within the cylinder 32 is a toroidal plasma confinement region 50 in which a toroidal magnetic field is provided by the current in the walls of the cylinder 32 and central rod 44. This field is provided by a power source 51. The source 51 is connected through external connectors and switch means 53, such as a thyratron, to a toroidal primary transformer winding 54 which is wound about a magnetic core 55 positioned within and insulated from the lower portion 28 of the housing 26. It may be readily observed that closing of the switch 53 will cause a current in the primary winding 54 which will induce a current in the housing 26. The housing will thus constitute a single turn, axially symmetrical secondary winding of a transformer. Since the secondary current travels generally around the minor circumference of the toroidal plasma region 50, the magnetic field resulting therefrom will also be generally toroidal, i.e., parallel to the minor axis of the toroidal plasma confinement region 50.

The plasma confinement region is defined by a hermetically sealed toroidal plasma confinement chamber 73 which as illustrated comprises a container or jacket 74 formed of a nonmagnetic material such as nonmagnetic stainless steel. The walls of the jacket 74 should be outside of the stable confinement region produced by the entire apparatus to avoid contact of the plasma therewith and insulated from the housing 26 by insulation layer 75.

A generally multipolar configuration for the toroidal magnetic field is provided by second magnetic field producing means comprising two toroidal conductors 76 in planes perpendicular to the major axis of the toroidal confinement region. The conductors 76 are each outside of the housing 26 and suitably insulated therefrom by insulation 77. The conductors 76 are connected through switch means 78 to a power source 80 so that upon actuation of the switch current flows in the same direction in each conductor.

Although in many prior devices conductors for producing such a field have been circular in cross section, in the present apparatus it is preferred to use flattened conductors due to the greater ease of fabrication of such coils. While such coils provide a somewhat different field configuration than round coils, particularly close to the coils, since the plasma is to be confined adjacent the minor axis of the toroidal region, the approximation produced by a flat coil is good in this region for equal coil currents. Moreover, a flat coil extends laterally the region where the confining field is useful as compared with a coil at the same distance from the toroid's minor axis which is round in cross section.

The magnetic field which is produced by these coils is a quadrupole field with poles at each of the toroidal conductors 76, i.e., outside of the plasma confinement region. However, this undesired position of the poles is prevented and the poles are caused to be within the confinement region by a third magnetic field producing means. The illustrated third means comprises two planar coils 84 and 86 positioned in planes perpendicular to the major axis of the toroidal region and on each side of the region. Preferably these coils are positioned between respective quadrupole coils 76 and the conductive top and bottom walls 34 and 40 and are of course insulated therefrom by suitable insulation 87. Each of the coils 84 and 86 comprises a plurality of curved conductors 88 and 89 respectively extending across the toroidal region. The conductors 88 are positioned on spiral curves. The spiral curves on which the conductors of each coil are positioned have opposite senses, i.e., one set of spiral curves is clockwise and the other is counterclockwise. Thus it may be seen that FIG. 3 may be taken, for example, as either a top view of top coil 84 or a bottom view of bottom coil 86.

The conductors 88 are electrically connected to one another and to a power source 90 through switch means 92 so that current flows in opposite directions in adjacent conductors, as shown by the arrows in FIG. 3. The resultant magnetic fields provide rotational transform and redirect the average flux lines so that they form flux surfaces which close within the plasma confinement region. As best illustrated in FIG. 2 the fields are approximately symmetric with respect to the toroid's major axis. One means of interconnecting the conductors is shown in FIG. 3 wherein conductors 96 are provided in the plane of the coils, alternately adjacent the inner and outer ends of the curved conductors 88. This particular arrangement may be especially easily fabricated from a simple flat plate of a conductive material such as copper by merely cutting out the portions separating the conductors.

In some instances, however, the current in the connecting conductors 96 which is unidirectional in the azimuthal direction at the innermost and outermost portions of the coils 84 and 86 may create an undesirable component of the magnetic field. This problem may be eliminated by the arrangement shown schematically in FIG. 4. For clarity this drawing shows only four of the conductors 88 in the top coil 84 in solid lines and four of the conductors 89 in the bottom coil 86 in dashed lines. The conductors in the two coils are interconnected by straight conductors 98 parallel to the major axis of the toroid and at the innermost and outermost portions of the toroid. The arrows indicate the directions of the currents, which may be seen to be similar in direction to that shown in FIG. 3. However, the azimuthal currents have been eliminated.

In FIG. 5, an alternative means for producing the toroidal magnetic field is illustrated. As there shown the single turn coil provided by the housing 26, including the upper portion 32, lower portion 28 and core 55, is replaced by a plurality of coils 100 surrounding and spaced around the toroidal region. This arrangement makes access to the confinement region from the side easier to provide. However, a sufficient number of coils must be provided to maintain the toroidal field without distortion. In general it is desirable that the distance between coils 100 should be less than one third of the distance from a coil 100 to the surface of the confined stable plasma.

The region of stable confinement may be defined as the region bounded by the flux surface which has the smallest surface area common to both elliptical axes of the magnetic field. Ordinarily the region inside this flux surface would be used to confine plasma, although in some cases additional volume outside of this region might be provided.

The planar coils, as previously noted, serve to redirect the flux lines so that they form flux surfaces which close within the plasma confinement region. However, these coils have relatively little effect on the field in the central portion of the region, because the currents in each have the opposite sense from the other and the resulting effects on the field tend to cancel one another out as a central position is approached.

In a specific embodiment similar to that shown in FIGS. 1–3 a toroidal confinement chamber 73 has a major radius of 0.5 meters and a minor radius of 0.1 meters. Thirty curved conductors 88 and 89 are provided in each planar coil 84 and 86 and ampere turns of $1.4 \times 10^6$ are provided in each such coil. The ampere turns in each quadrupole coil was $2 \times 10^4$. The ampere turns in the toroidal coil 26 are $1.25 \times 10^6$. This results in a field of 5,000 gauss at the center of the confinement region.

Utilizing the above described apparatus it is possible to provide a larger magnetic shear than is provided in known "high shear" Stellarators. The rotational transform angle decreases moving toward the separatrix from the elliptic magnetic axes and vanishes at the separatrix. It increases again outside the separatrix and reaches a maximum at the flux surface bounding the stable confinement region. Conversely the magnetic shear decreases from 0 to $-\infty$ going from the magnetic axes to the separatrix and from $+\infty$ to zero going from the separatrix to the shortest flux surface. An average shear of approximately unity may be obtained by choosing a small ratio of the toroidal circumference to the poloidal circumference.

For apparatus where the ratio of the radius of the toroid to the height of the stable confinement region is less than about 3 to 1 an additional magnetic field parallel to the major axis may be required. When the above ratio becomes small the magnetic field gradient due to the toroid curvature may keep the flux surfaces from closing. When the flux surfaces do not close, the addition of a magnetic field parallel to the major axis will compensate for the magnetic field gradient and thereby cause the flux surfaces to close. The parallel magnetic field may be produced by any appropriate coil, for example, a solenoidal coil 102 located parallel to the major axis and external to the confinement region as shown in FIG. 5.

The apparatus is much simpler to fabricate and install than helically wound apparatus since all the coils are two dimensional. Further, the sides of the torus are much more accessible for installation of various auxiliary structures such as vacuum ports, plasma injection devices and plasma diagnostic devices.

Various changes and modifications could be made in the described apparatus without departing from the invention. For example, the second and third magnetic field producing means could be positioned on each side of the toroidal region along major radii of the toroid and extensions thereof, i.e. with coils in the central aperture of the toroid and beyond the toroidal confinement space on extended radii.

Various features of the invention are set forth in the accompanying claims.

What is claimed is:

1. Apparatus for confining plasma comprising a sealed toroidal housing surrounding a toroidal plasma confinement region having a major axis and a minor axis, first magnetic field producing means positioned outside of said housing for providing a toroidal magnetic field in said region, second magnetic field producing means positioned outside of said housing for providing a multipolar configuration for said toroidal magnetic field, and third magnetic field producing means for providing rotational transform for said multipolar toroidal magnetic field, said third means comprising conductive coils positioned outside of said housing and on each side of said toroidal region extending entirely across said region and spaced from one another along the major axis of the toroidal region, so that the resultant magnetic field produced by the actuation of all of said magnetic field producing means comprises a plurality of nests of closed toroidal flux surfaces entirely within said region.

2. Apparatus in accordance with claim 1 wherein said flux surfaces are substantially symmetric with respect to the major axis of the said toroidal region.

3. Apparatus in accordance with Claim 1 wherein said coils are two planar coils perpendicular to the major axis of the toroidal region.

4. Apparatus in accordance with claim 3 wherein said planar coils each comprise a plurality of curved conductors positioned on segments of spiral curves.

5. Apparatus in accordance with claim 4 wherein said conductors are connected to one another so that current in adjacent conductors flows in opposite directions.

6. Apparatus in accordance with claim 5 wherein said spiral curves have a clockwise orientation for one of said coils and a counter-clockwise orientation for the other of said coils.

7. Apparatus in accordance with claim 6 wherein adjacent curved conductors in each coil are connected in series by conductors in the plane of said coil.

8. Apparatus in accordance with claim 6 including a plurality of straight conductors parallel to the major axis of said toroidal region alternately connecting the curved conductors in one of said coils with the curved conductors in the other of said coils so as to eliminate azimuthal currents.

9. Apparatus in accordance with claim 1 wherein said first magnetic field producing means comprises a plurality of spaced apart cylindrical coils surrounding said plasma confinement region so that access to said region between said coils is possible.

10. Apparatus in accordance with claim 1 wherein said second magnetic field producing means is more remote from said toroidal region than both of said other magnetic field producing means and said third magnetic field producing means is more remote from said toroidal region than said first magnetic field producing means.

11. Apparatus in accordance with claim 1 wherein said first magnetic field producing means comprises a single turn axially symmetrical secondary winding of a transformer.

12. Apparatus in accordance with claim 11 wherein said housing comprises said first magnetic field producing means.

* * * * *